US012677008B2

(12) United States Patent
Du et al.

(10) Patent No.: US 12,677,008 B2
(45) Date of Patent: Jul. 7, 2026

(54) MULTI-FEATURE SAMPLE OFFSET FILTERING SYSTEM FOR VIDEO CODING AND DECODING

(71) Applicant: Apple Inc., Cupertino, CA (US)

(72) Inventors: Yixin Du, Milpitas, CA (US); Alexandros Tourapis, Los Gatos, CA (US); Yunfei Zheng, Santa Clara, CA (US); Jun Xin, San Jose, CA (US); Alican Nalci, Cupertino, CA (US); Mei T. Guo, San Jose, CA (US); Yeqing Wu, Cupertino, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 92 days.

(21) Appl. No.: 17/979,025

(22) Filed: Nov. 2, 2022

(65) Prior Publication Data

US 2023/0142771 A1 May 11, 2023

Related U.S. Application Data

(60) Provisional application No. 63/277,319, filed on Nov. 9, 2021.

(51) Int. Cl.
  *H04N 19/82* (2014.01)
  *H04N 19/132* (2014.01)
  (Continued)

(52) U.S. Cl.
  CPC ........... *H04N 19/82* (2014.11); *H04N 19/132* (2014.11); *H04N 19/176* (2014.11); *H04N 19/186* (2014.11)

(58) Field of Classification Search
  CPC .... H04N 19/82; H04N 19/132; H04N 19/176; H04N 19/186
  See application file for complete search history.

(56) References Cited

U.S. PATENT DOCUMENTS 11,818,343 B2 * 11/2023 Zhao ...................... H04N 19/46
2014/0301487 A1 * 10/2014 Laroche ............... H04N 19/117
                                                       375/240.29
(Continued)

FOREIGN PATENT DOCUMENTS

CN          103959794 A      7/2014
WO     WO-2013098937 A1 *   7/2013   ............. H04N 19/82

OTHER PUBLICATIONS

European Patent Application No. 22205085.8; Extended Search Report; dated Mar. 16, 2023; 9 pages.
(Continued)

*Primary Examiner* — Dave Czekaj
*Assistant Examiner* — Shanika M Brumfield
(74) *Attorney, Agent, or Firm* — BakerHostetler

(57) ABSTRACT

A filtering system for video coders and decoders is disclosed that includes a feature detector having an input for samples reconstructed from coded video data representing a color component of source video, and having an output for data identifying a feature recognized therefrom, an offset calculator having an input for the feature identification data from the feature detector and having an output for a filter offset, and a filter having an input for the filter offset from the offset calculator and an input for the reconstructed samples, and having an output for filtered samples. The filtering system is expected to improve operations of video coder/decoder filtering systems by selecting filtering offsets from analysis of recovered video data in a common color plane as the samples that will be filtered.

31 Claims, 4 Drawing Sheets

(51) Int. Cl.
H04N 19/176 (2014.01)
H04N 19/186 (2014.01)

(56) References Cited

U.S. PATENT DOCUMENTS

| | | | |
|---|---|---|---|
| 2014/0376608 A1* | 12/2014 | Tourapis | H04N 19/463 |
| | | | 375/240.02 |
| 2017/0019685 A1* | 1/2017 | Morigami | H04N 19/117 |
| 2018/0352225 A1 | 12/2018 | Guo et al. | |
| 2020/0029095 A1 | 1/2020 | Karczewicz et al. | |
| 2020/0366918 A1 | 11/2020 | Erfurt et al. | |
| 2022/0182635 A1* | 6/2022 | Li | H04N 19/172 |
| 2023/0048262 A1* | 2/2023 | Sim | H04N 19/176 |
| 2023/0336785 A1* | 10/2023 | Kuo | H04N 19/82 |

OTHER PUBLICATIONS

Kuo et al.; "AHG12: Cross-component Sample Adaptive Offset"; Document: JVET-V0153-v2; Joint Video Expert Team; Apr. 20-28, 2021; 4 pages.

Webpage;"Git at Google"; https://aomedia.googlesource.com/aom/+/refs/tags/research-v2.0.0; Oct. 27, 2022; 14 pages.

S. Midtskogen et al.; The AV1 Constrained Directional Enhancement Filter (CDEF); Oct. 28, 2017; 5 pages.

Y. Du et al.; "Cross-Component Sample Offset"; Alliance for Open Media, Codec Working Group; Document: CWG-B022-v3; Mar. 17, 2021; 6 pages.

X. Zhao et al.; "AOM Common Test Conditions v2.0"; Alliance for Open Media, Codec Working Group; Document: CWG-B075o; Aug. 31, 2021; 28 pages.

C. Rosewarne; "High Efficiency Video Calling (HEVC) Test Model 16 (HM 16)"; Joint Collaborative Team on Video Coding (JCT-VC) of ITU-T SG16 WP3 and ISO/IEC JTC1/SC29/WG11 40th Meeting: by teleconference; Jun. 24-Jul. 1, 2020; Document: JCTVC-AN1002; 77 pages.

A. M. Tourapis et al.: "Clipping During 4:2:0 to 4:4:4 Conversions"; Joint Collaborative Team on Video Coding (JCT-VC) of ITU-T SG 16 WP 3 and ISO/IEC JTC 1/SC 29/WG 11; 21st Meeting: Warsaw, PL, Jun. 19-26, 2015; Document: JCTVC-U0042; 5 pages.

J. Chen et al.; "Algorithm Description for Versatile Video Coding and Test Model 13 (VTM 13)"; Joint Video Experts Team (JVET) of ITU-T SG 16 WP 3 and ISO/IEC JTC 1/SC 29; 22nd Meeting by teleconference; Apr. 20-28, 2021; Document: JVET-v2002-v1; 103 pages.

* cited by examiner

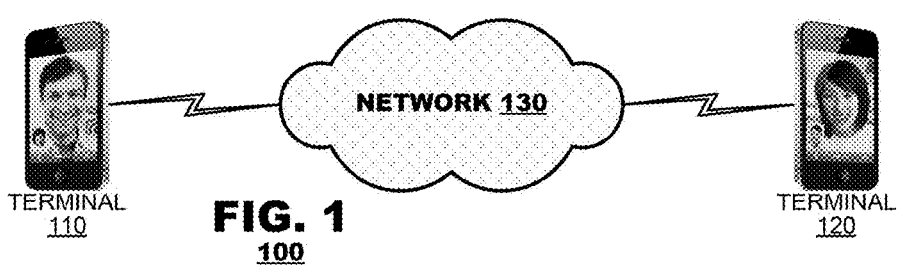
FIG. 1
100
TERMINAL 110
NETWORK 130
TERMINAL 120
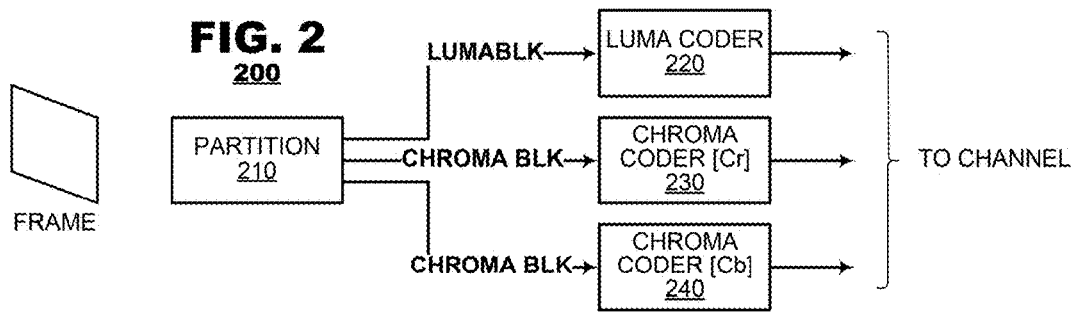
FIG. 2
200
FRAME
PARTITION 210
LUMA BLK → LUMA CODER 220
CHROMA BLK → CHROMA CODER [Cr] 230
CHROMA BLK → CHROMA CODER [Cb] 240
TO CHANNEL
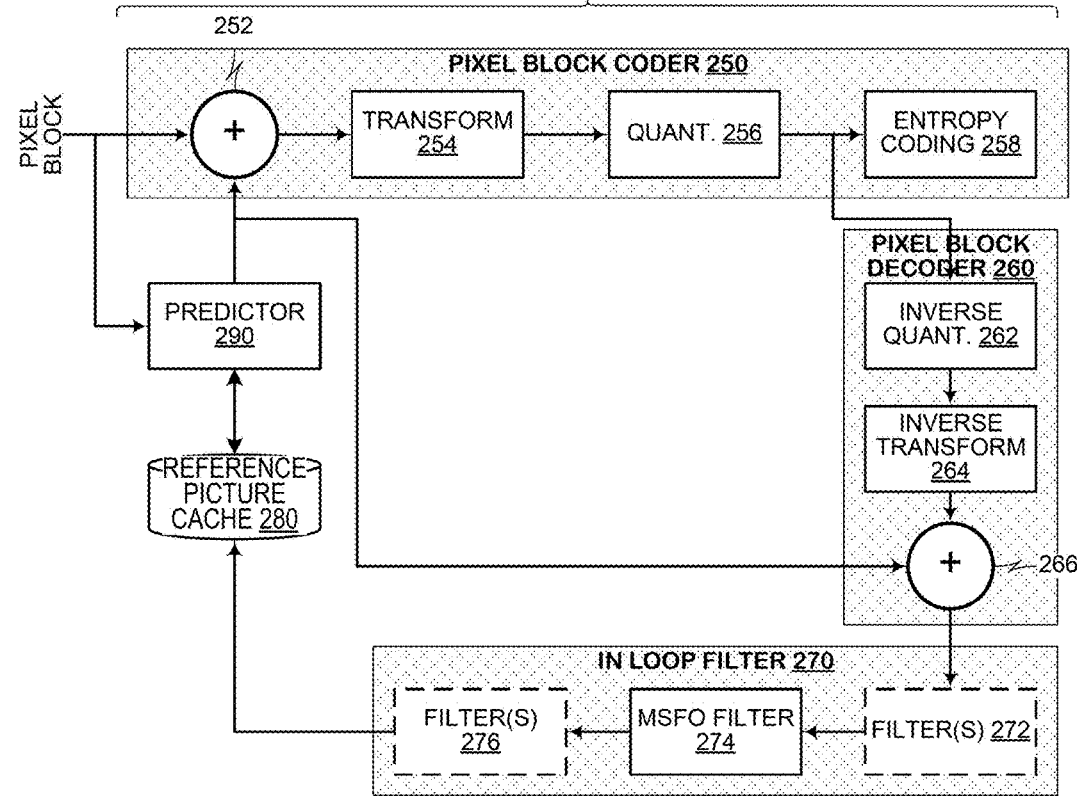
252
PIXEL BLOCK CODER 250
PIXEL BLOCK → + → TRANSFORM 254 → QUANT. 256 → ENTROPY CODING 258
PREDICTOR 290
REFERENCE PICTURE CACHE 280
PIXEL BLOCK DECODER 260
INVERSE QUANT. 262
INVERSE TRANSFORM 264
+ — 266
IN LOOP FILTER 270
FILTER(S) 276 ← MSFO FILTER 274 ← FILTER(S) 272

300

400

RECONSTRUCTED SAMPLES

FEATURE DETECTOR
410

INDEX CALCULATOR
420

FEATURE ID

OFFSET

FILTER 440

CORRECTED SAMPLES

OFFSET CALCULATOR
430

$d_0, d_1$

400

W

H $r_i$

600

615   620   625
630   635   640   645   650   610   655   660   665   670   675
680   685   690

$r_i$

700

800

900

MULTI-FEATURE SAMPLE OFFSET FILTERING SYSTEM FOR VIDEO CODING AND DECODING

CROSS REFERENCE TO RELATED APPLICATIONS

This application claims benefit under 35 U.S.C. § 119(e) of Provisional U.S. patent application No. 63/277,319, filed Nov. 9, 2021, the contents of which are incorporated herein by reference in its entirety.

BACKGROUND

The present disclosure relates to techniques for video coding and decoding for bandwidth-limited communication channels and, particularly, to techniques for in-loop filtering for such applications.

Video coding/decoding applications typically exploit spatial and/or temporal redundancies in video data to generate a coded representation of video data that has reduced bandwidth as compared to the source video data from which it was generated. These techniques often apply prediction algorithms that predict video content from earlier-coded content, determine differences between the actual video content and its predicted content, then code residuals representing these differences. In this manner, a video coding device and a video decoding device employ algorithms to maintain synchronized representations of prediction data.

Video coding/decoding techniques often are "lossy" processes, meaning that recovered video data generated by decoding the coded video data will exhibit errors when compared to the source video data from which it was generated. Prediction algorithms operate in a domain of recovered video data since a video decoder does not have access to the source video data.

Decoding algorithms may apply filtering to recovered video data before it is employed in prediction to improve the quality of the recovered video data. Filtering algorithms may be applied within a prediction "loop," meaning they are applied in the same way by a video encoder and a video decoder so that they remain synchronized. Filtering algorithms that impair the quality of recovered video data, naturally, are disfavored. Accordingly, video coders and decoders are designed to adjust filtering operations dynamically to improve overall quality of video.

BRIEF DESCRIPTION OF THE DRAWINGS

FIG. 1 is a block diagram of a video coding system according to an embodiment of the present disclosure.

FIG. 2 is a block diagram of a video coder according to an embodiment of the present disclosure.

DETAILED DESCRIPTION

Figure 3:
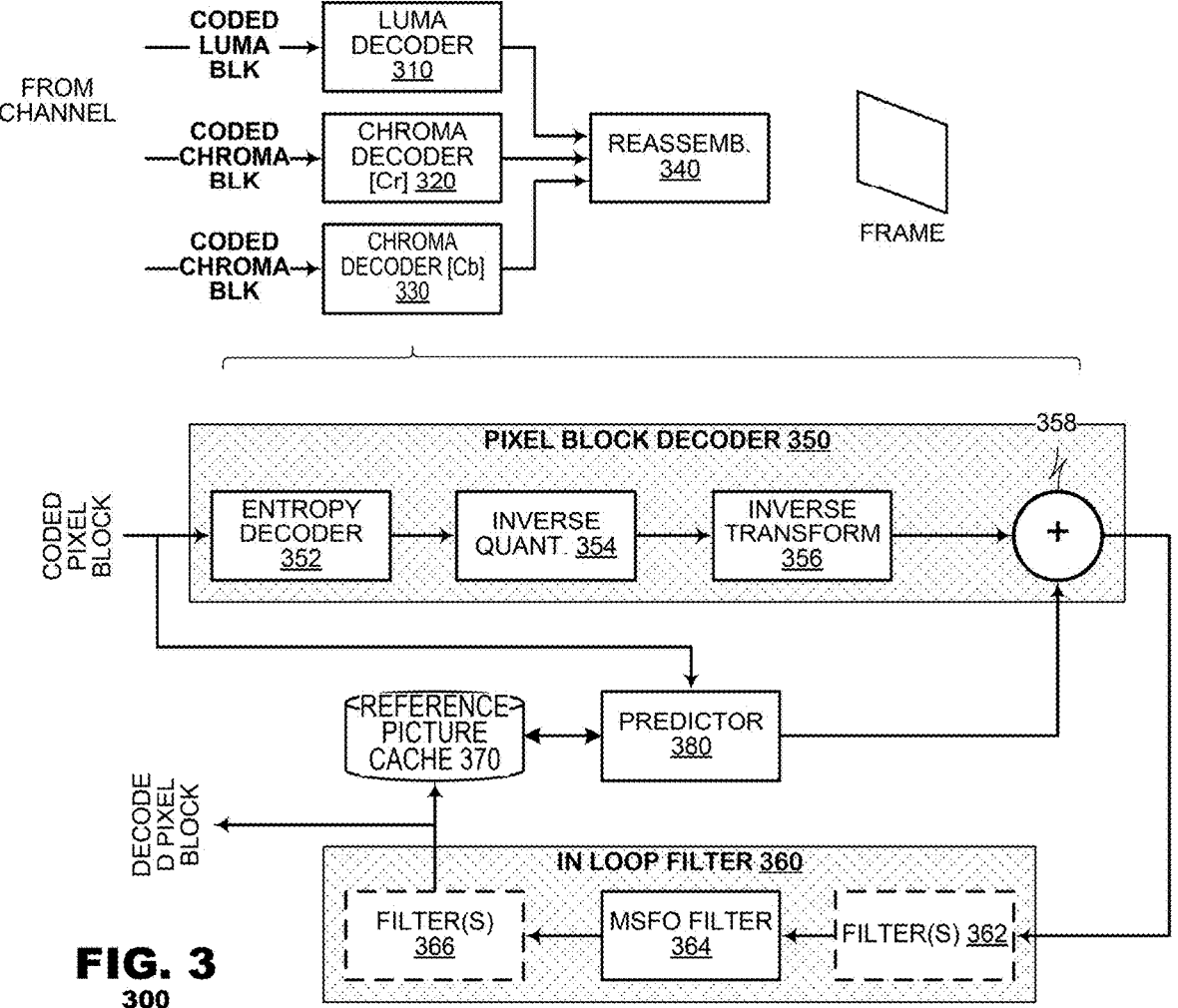
FIG. 3 is a block diagram of a video decoder according to an embodiment of the present disclosure.

Embodiments of the present disclosure provide a filtering system for video coders and decoders that includes a feature detector having an input for samples reconstructed from coded video data representing a color component of source video, and having an output for data identifying a feature recognized therefrom, an offset calculator having an input for the feature identification data from the feature detector and having an output for a filter offset, and a filter having an input for the filter offset from the offset calculator and an input for the reconstructed samples, and having an output for filtered samples. The filtering system is expected to improve operations of video coder/decoder filtering systems by selecting filtering offsets from analysis of recovered video data in a common color plane as the samples that will be filtered.

FIG. 1 illustrates a simplified block diagram of a video coding system 100 according to an embodiment of the present disclosure. The system 100 may include a plurality of terminals 110-120 interconnected via a network 130. Certain terminals may code video data for transmission to another terminal via the network 130. Other terminals may receive the coded video data of the other terminal from the network 130, decode the coded data and consume video data recovered therefrom, typically by displaying the decoded video.

A video coding system 100 may be used in a variety of applications. In a first application, a pair of terminals 110, 120 may support real time bidirectional exchange of coded video to establish a video conferencing session between them. In another application, a terminal 110 may code pre-produced video (for example, television or movie programming) and store the coded video for delivery to one or, often, many downloading client(s) 120. Thus, the video being coded may be live or pre-produced and it may be distributed in a one-to-one or one-to-many distribution model. For the purposes of the present discussion, the type of video and the video distribution schemes are immaterial unless otherwise noted.

In FIG. 1, the terminals 110-120 are illustrated as smart phones, but the principles of the present disclosure are not so limited. Embodiments of the present disclosure find application, among others, with set-top boxes, TVs, computers (both desktop and laptop computers), tablet computers, computer servers, media players and/or dedicated video conferencing and entertainment equipment, among others.

The network 130 represents any number of networks that convey coded video data between the terminals 110-120, including, for example, wireline and/or wireless communication networks. The communication network 130 may exchange data in circuit-switched or packet-switched channels. Representative networks include telecommunications networks, local area networks, wide area networks and/or the Internet. For the purposes of the present discussion, the architecture and topology of the network 130 are immaterial to the operation of the present disclosure unless otherwise noted.

FIG. 2 shows a simplified block diagram of a coding system 200 in an embodiment of the present disclosure. The system 200 may code input frames of a video sequence by compression techniques that reduce the frames' bitrate size. The system may include a partitioning unit 210 and one or more coding units 220-240. The partitioning unit 210 may deconstruct content of input frames, first, according to their components in a color space such as by deconstructing them into luminance (often "luma" for short) and chrominance components (there often are two chrominance components, labeled Cr and Cb). The partitioning unit may output component data to their respective color coders 220-240. In the example of FIG. 2, luma color data is output to a luma coder 220, Cr color data is output to a Cr coder 230, and Cb color data is output to a Cb coder 240. Although FIG. 2 illustrates application to a Y/Cb/Cr color space, the principles of the present disclosure are not so limited; except as described below, the principles of the present disclosure find application with other color spaces such as RGB, XYZ, and the like.

The partitioning unit 210 also may parse the data of each color component into spatial arrays, called "pixel blocks." Many coding protocols employ various types of partitioning schemes, which may be recursive; the partitioning unit 210 may work cooperatively with such schemes. Thus, color component data may be partitioned according to a quadtree partitioning scheme, which may yield coding units of different sizes that would be processed by the coders 220-240. Alternatively, the color component data may be partitioned into macroblocks and further into blocks for coding by the coders 220-240. It often may occur that the pixel blocks of a color plane frame may have different block sizes within the frame. Moreover, it may occur that the pixel blocks generated for one coder (say, the luma coder 220) may have different sizes than to pixel blocks generated for the other coders (the Cr coder 230 and/or the Cb coder 240). Oftentimes, the pixel block sizes and arrangement within a color plane are selected from an analysis of content of that plane.

The coders 220-240 may perform coding operations on their respective color plane data to reduce its bandwidth. Typically, the coders 220-240 exploit temporal and/or spatial redundancies within their input data. For example, the coders 220-240 may perform motion compensated predictive coding in which an input pixel block is coded according to any one of a variety of predictive coding modes, such as:

intra-coding, in which an input pixel block is coded differentially with respect to previously coded/decoded data of a common frame;

single prediction inter-coding, in which an input pixel block is coded differentially with respect to data of a previously coded/decoded frame; and multi-hypothesis motion compensation predictive coding, in which an input pixel block is coded predictively using decoded data from two or more sources, via temporal or spatial prediction.

The predictive coding modes may be used cooperatively with other coding techniques, such as Transform Skip coding, RRU coding, scaling of prediction sources, palette coding, and the like.

FIG. 2 illustrates exemplary functional units of a pixel block encoder, which may be applied in the luma, Cr, and Cb coders 220, 230, 240. The pixel block encoder may include a pixel block coder 250, a pixel block decoder 260, an in loop filter 270, a reference picture cache 280, and a predictor 290. The pixel block coder 250 may code an input pixel block with reference to a predicted pixel block supplied by the predictor 290 and output coded pixel block data obtained therefrom. The pixel block decoder 260 may invert the coding operations applied by the pixel block coder 250 to obtain decoded pixel block data therefrom. The in loop filter 270 may apply selected filtering operations on decoded pixel block data, which may be reconstituted into recovered frames and stored in the reference picture cache 280. The predictor 290 may supply prediction data to the pixel block coder 250 as prediction data.

The pixel block coder 250 may include a subtractor 252, a transform unit 254, a quantizer 256, and an entropy coder 258. The pixel block coder 250 may accept pixel blocks of input data at the subtractor 252. The subtractor 252 may receive predicted pixel blocks from the predictor 290 and generate an array of pixel residuals therefrom representing a difference between the input pixel block and the predicted pixel block. The transform unit 254 may apply a transform to the sample data output from the subtractor 252, to convert data from the pixel domain to a domain of transform coefficients. The quantizer 256 may perform quantization of transform coefficients output by the transform unit 254. The quantizer 256 may be a uniform or a non-uniform quantizer. The entropy coder 258 may reduce bandwidth of the output of the coefficient quantizer by coding the output, for example, by variable length code words or using a context adaptive binary arithmetic coder.

The transform unit 254 may operate in a variety of transform modes. For example, the transform unit 254 may apply a discrete cosine transform (DCT), a discrete sine transform (DST), a Walsh-Hadamard transform, a Haar transform, a Daubechies wavelet transform, or the like. In an aspect, a controller (not shown) may select a coding mode M to be applied by the transform unit 254, may configure the transform unit 254 accordingly and may signal the coding mode M in the coded video data, either expressly or impliedly.

The quantizer 256 may operate according to a quantization parameter QP that is supplied by the controller (not shown). In an aspect, the quantization parameter QP may be applied to the transform coefficients as a multi-value quantization parameter, which may vary, for example, across different coefficient locations within a transform-domain pixel block. Thus, the quantization parameter QP may be provided as a quantization parameters array.

The entropy coder 258, as its name implies, may perform entropy coding of data output from the quantizer 256. For example, the entropy coder 258 may perform run length coding, Huffman coding, Golomb coding, Context Adaptive Binary Arithmetic Coding, and the like.

The pixel block decoder 260 may invert coding operations of the pixel block coder 250. For example, the pixel block decoder 260 may include an inverse quantizer 262, an inverse transform unit 264, and an adder 266. The pixel block decoder 260 may take its input data from an output of the quantizer 256. Although permissible, the pixel block decoder 260 need not perform entropy decoding of entropy-coded data since entropy coding is a lossless event. The inverse quantizer 262 may invert operations of the quantizer 256 of the pixel block coder 250. The inverse quantizer 262 may perform uniform or non-uniform de-quantization as specified by the decoded signal QP. Similarly, the inverse transform unit 264 may invert operations of the transform unit 254. The inverse quantizer 262 and the inverse transform unit 264 may use the same quantization parameters QP and transform mode M as their counterparts in the pixel block coder 250. Quantization operations often truncates data in various respects and, therefore, data recovered by the inverse quantizer 262 likely will possess coding errors when compared to the data presented to the quantizer 256 in the pixel block coder 250.

The adder 266 may invert operations performed by the subtractor 252. It may receive the same prediction pixel block from the predictor 290 that the subtractor 252 used in generating residual signals. The adder 266 may add the prediction pixel block to reconstructed residual values output by the inverse transform unit 264 and may output reconstructed pixel block data.

As described, the in-loop filter 270 may perform various filtering operations 272-276 on recovered pixel block data. The in-loop filter may possess a multi-feature sample offset ("MFSO") filter 274 as discussed hereinbelow. In an embodiment, the MFSO filter 274 may be part of a multi-filter filtering system 270 which may include other filters 272, 276. Such other filters may include, for example, a deblocking filter, a sample adaptive offset ("SAO") filter, a constrained directional enhancement filter ("CDEF"), an adaptive loop filter ("ALF"), a cross-component adaptive loop filter ("CCALF"), and/or a loop restoration ("LR") filter.

The MFSO filter 274 proposed herein may work cooperatively with other filtering units within the in loop filter 270. For example, the MFSO filter 274 may be accept input data from a deblocking filter and output filtered data to a CDEF. Alternatively, the MFSO filter 274 may be accept input data from a CDEF and output filtered data to a LR filter. In another embodiment, MFSO may be placed in parallel to a CDEF; in this application, the input of MFSO may be the reconstructed samples before CDEF and the MFSO's output may be applied to the reconstructed samples obtained from the CDEF. In a further embodiment, the MFSO filter 274 may accept input data from a deblocking filter and output filtered data to an ALF.

As discussed, the reference picture cache 280 may store filtered frame data for use in later prediction of other pixel blocks. Different types of prediction data are made available to the predictor 290 for different prediction modes. For example, for an input pixel block, intra prediction takes a prediction reference from decoded data of the same frame in which the input pixel block is located. Thus, the reference picture cache 280 may store decoded pixel block data of each frame as it is coded. For the same input pixel block, inter prediction may take a prediction reference from previously coded and decoded frame(s) that are designated as reference frames. Thus, the reference picture cache 280 may store these decoded reference frames.

As discussed, the predictor 290 may supply prediction blocks to the pixel block coder 250 for use in generating residuals. The predictor 290 may include, an inter predictor, an intra predictor, and a mode decision unit (not shown). The inter predictor may receive pixel block data representing a new pixel block to be coded and may search reference frame data from reference picture cache 280 for pixel block data from reference frame(s) for use in coding the input pixel block. The inter predictor may select prediction reference data that provides a closest match to the input pixel block being coded. The inter predictor may generate prediction reference metadata, such as prediction block size and motion vectors, to identify which portion(s) of which reference frames were selected as source(s) of prediction for the input pixel block.

The intra predictor may support Intra (I) mode coding. The intra predictor may search from among pixel block data from the same frame as the pixel block being coded that provides the closest match to the input pixel block. The intra predictor also may generate prediction mode indicators to identify which portion of the frame was selected as a source of prediction for the input pixel block.

The mode decision unit may select a final coding mode for the hypothesis from the output of the inter-predictor and the inter-predictor. The mode decision unit may output prediction data and the coding parameters (e.g., selection of reference frames, motion vectors and the like) for the selected prediction mode. Typically, as described above, the mode decision unit will select a mode that achieves the lowest distortion when video is decoded given a target bitrate. Exceptions may arise when coding modes are selected to satisfy other policies to which the coding system 200 adheres, such as satisfying a particular channel behavior, or supporting random access or data refresh policies.

As discussed herein, embodiments of the present disclosure propose an MFSO filtering system to improve the quality of the input reconstructed samples. MFSO uses multiple features detected from within image content to derive the input sample classifications. In one embodiment, data input to an MFSO are the reconstructed samples in one color component, and the output offset of MFSO is applied on the same color component. For example, example, the input of MFSO in the luma coder 220 are the reconstructed samples in the luma component, and the output offset of MFSO is applied on the luma component. In another example, the input of MFSO in the Cr coder 230 are the reconstructed samples in the Cr component, and the output offset of MFSO is applied on the Cr component. In another example, the input of MFSO in the Cb coder 240 are the reconstructed samples in the Cb component, and the output offset of MFSO is applied on the Cb component.

In another embodiment, the input data to an MFSO of one color component may include reconstructed samples from another color component, and the output offset of MFSO is applied on any other color component. For example, the input of MFSO of the Cr coder 230 or the Cb coder may include reconstructed samples in the luma component, and the output offset of MFSO is applied on the Cb/Cr component.

FIG. 3 is a block diagram of a decoding system 300 according to an embodiment of the present disclosure. The decoding system 300 may decode frames of a video sequence that have been coded by an encoder, for example, the encoder illustrated FIG. 2. The decoding system 300 may include one or more coding units 310-330, which may invert coding operations performed, respectively, by the coding units 220-240 of FIG. 2. Thus, continuing with the example of FIG. 2, the decoding system 300 may have a luma decoder 310, a Cr chroma decoder 320, and a Cb chroma decoder 330. The decoding system 300 may have a reassemble 340 that may generate recovered frames from color component data output by the decoders 310-330. As with FIG. 2, although the decoding system 300 of FIG. 3 illustrates application to a Y/Cb/Cr color space, the principles of the present disclosure find application with other color spaces such as RGB, XYZ, and the like.

FIG. 3 illustrates exemplary functional units of a pixel block decoder, which may be applied in the luma, Cr, and Cb decoders 310-340. The decoder may pixel block decoder 350, an in-loop filter 360, a reference picture cache 370, and a predictor 380 operating under control of a controller (not shown).

The predictor 380 may receive prediction metadata identifying prediction mode and prediction references of a coded pixel block and may output prediction data from the reference picture cache 370 to the pixel block decoder 350. The pixel block decoder 350 may generate a recovered pixel block from the coded pixel block data and prediction data supplied by the predictor 380. The in-loop filter 360 may filter the reconstructed pixel block data, which may be output from the decoder 350. For frames that are designated to serve as reference frames, the in loop filter's output also may be stored in the reference picture cache 370.

The pixel block decoder 350 may include an entropy decoder 352, an inverse quantizer 354, an inverse transform unit 356, and an adder 358. The entropy decoder 352 may perform entropy decoding to invert processes performed by the entropy coder 258 (FIG. 2). The inverse quantizer 324 may invert operations of the quantizer 256 of the pixel block coder 250 (FIG. 2). Similarly, the inverse transform unit 326 may invert operations of the transform unit 254 (FIG. 2). They may use the quantization parameters QP and transform modes M that are provided in the coded video data stream. Because quantization is likely to truncate data, the pixel blocks recovered by the inverse quantizer 324, likely will possess coding errors when compared to the input pixel blocks s presented to the pixel block coder 250 of the encoder (FIG. 2).

The adder 358 may invert operations performed by the subtractor 252 (FIG. 2). It may receive a prediction pixel block from the predictor 380 as determined by prediction references in the coded video data stream. The adder 358 may add the prediction pixel block to reconstructed residual values output by the inverse transform unit 356 and may output reconstructed pixel block data.

As described, the in-loop filter 360 may perform various filtering operations 362-366 on recovered pixel block data, working synchronously with the in loop filter 270 of FIG. 2. The in-loop filter may possess a MFSO filter 364 as discussed hereinbelow. In an embodiment, the MFSO filter 364 may be part of a multi-filter filtering system 360 which may include other filters 362, 366. Such other filters may include, for example, a deblocking filter, an SAO filter, a CDEF, an ALF, a CCALF, and/or an LR filter.

The MFSO 364 proposed herein may work cooperatively with other filtering units within the in loop filter 360. For example, the MFSO 364 may be accept input data from a deblocking filter and output filtered data to a CDEF. Alternatively, the MFSO 364 may be accept input data from a CDEF and output filtered data to a LR filter. In another embodiment, MFSO may be placed in parallel to a CDEF; in this application, the input of MFSO may be the reconstructed samples before CDEF and the MFSO's output may be applied to the reconstructed samples obtained from the CDEF. In a further embodiment, the MFSO 364 may be accept input data from a deblocking filter and output filtered data to an ALF.

The reference picture cache 370 may store filtered frame data for use in later prediction of other pixel blocks. The reference picture cache 370 may store decoded frames as it is coded for use in intra prediction. The reference picture cache 370 also may store decoded reference frames.

As discussed, the predictor 380 may supply the prediction blocks to the pixel block decoder 350. The predictor 380 may retrieve prediction data from the reference frame cache 370 as determined by prediction reference indicators supplied in the coded video data stream.

Figures 4, 5, 6:
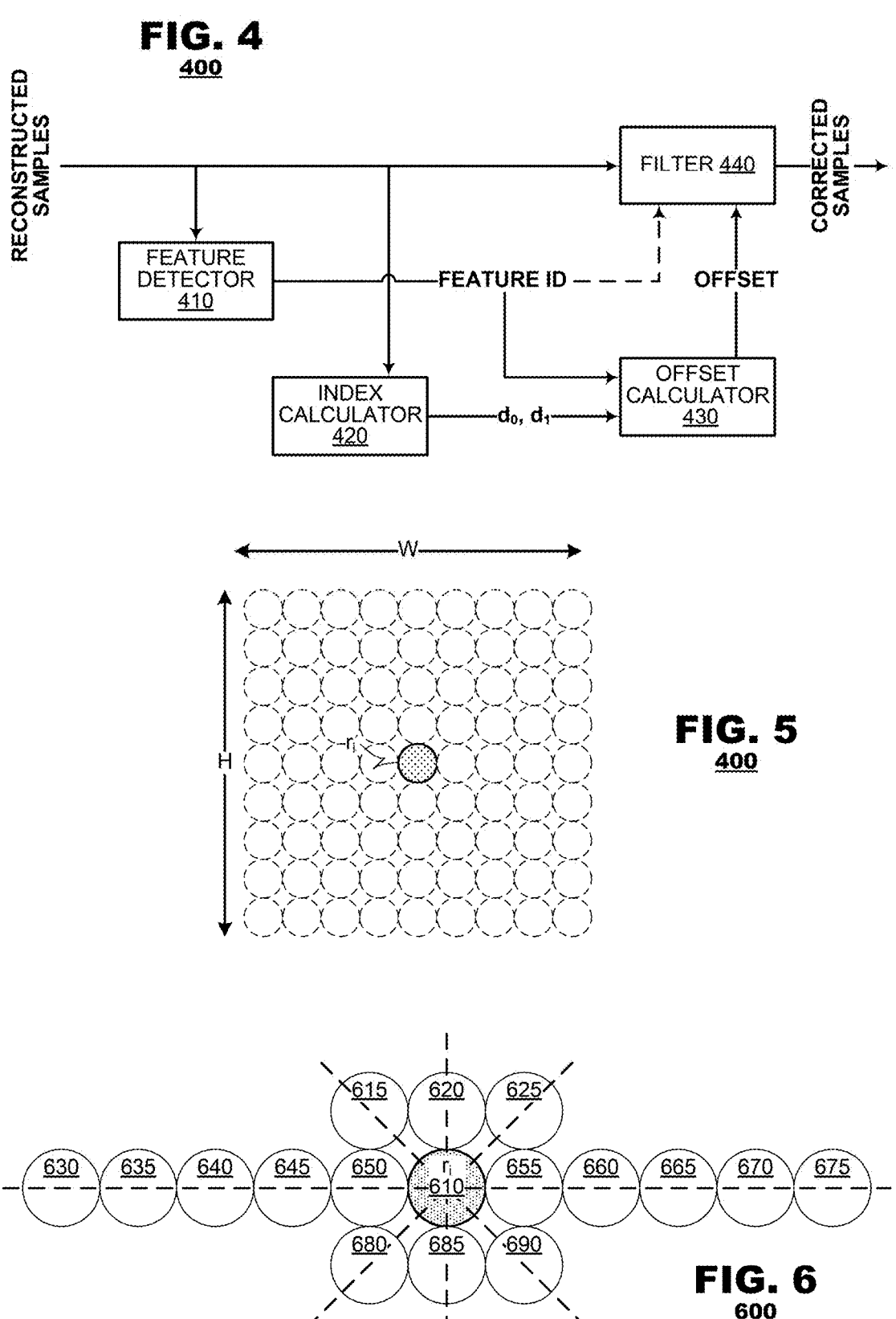
FIG. 4 is a block diagram of a multi-feature sample offset filter according to an embodiment of the present disclosure.
FIG. 5 illustrates an exemplary array of samples suitable for use with embodiments of the present disclosure.
FIG. 6 illustrates an exemplary array of samples suitable for use with embodiments of the present disclosure.

FIG. 4 is a block diagram of an MFSO 400 according to an embodiment of the present disclosure. The MFSO 400 may find application in encoders and decoders as illustrated in FIGS. 2 and 3 hereinabove. The MFSO 400 may include a feature detector 410, an index calculator 420, an offset calculator 430, and a filter 440. The MFSO 400 may receive a set of reconstructed samples and generator corrected samples therefrom. The feature detector 410 may detect predetermined feature(s) represented from among the input reconstructed samples and output identifiers of detected features to the offset calculator 430. The index calculator 420 may generate offset indices d0 and d1 from selected input samples, which are input to the offset calculator 430. The offset calculator 430 may generate an offset from its input data, which may be output to the filter 440. The filter 440 may filter reconstructed samples using the offset supplied by the offset calculator.

In an embodiment, the MFSO 400 may select filter 440 settings for individually for each reconstructed sample $r_i$ (FIG. 5) that is input to the in loop filter 270 (FIG. 2). The MFSO 400 may select the filter settings based on an analysis of other reconstructed samples that are present in a H×W spatial array 500 about the reconstructed sample $r_i$. In many embodiments, the array 500 may contain reconstructed samples from the same color plane in which the sample $r_i$ is present. In other embodiments, discussed below, the array 500 may contain reconstructed samples both from the same color plane and other color planes.

As discussed, the feature detector 410 may identify the presence and/or type of predetermined content features represented in the reconstructed samples. In one aspect, the feature detector 410 may analyze an array 500 of reconstructed samples to identify indicators of directionality in image content. The feature detector 410, for example, may perform edge detection to estimate the presence and orientation of edge content in the sample array 500. Alternatively, the feature detector 410 may apply texture classification to reconstructed samples in the array 500, may estimate variance among reconstructed samples in the array 500, or estimate differences in values among reconstructed samples in the array 500. When such analyses indicate that the array 500 contains identifiable directionality in image content, the feature detector 410 may generate a feature ID representing such directionality.

In another embodiment, the feature detector 410 may classify a reconstructed sample $r_i$ (FIG. 5) according to sample intensity. In a system in which sample values are represented numerically within to a predetermined range R, the range R may be partitioned into a number N of intensity bands where each band represents a portion of the overall range R. The feature detector 410 may generate a feature ID that identifies a band to which the reconstructed sample $r_i$ belongs.

Intensity bands may be defined in a variety of ways. As one example, the range R of sample values may be partitioned into a number N of uniformly-sized bands that, in aggregate, cover the entire range R of sample values. The value N may be predetermined within the system. Alternatively, N may be defined dynamically during system operation and signaled between an encoder and a decoder at predetermined intervals (e.g., in an APS, in a slice header, in a tile header, in a picture parameter set, in a sequence parameter set, in a video parameter set, or when N changes).

As another example, the range R of sample values may be partitioned into a number N of non-uniformly sized bands that, in aggregate, cover the entire range R of sample values. In this example, the number of bands and their sizes may be predetermined within the system. Alternatively, the number and size of the bands may be defined dynamically during system operation and signaled between an encoder and a decoder at predetermined intervals (e.g., in an APS, in a slice header, in a tile header, in a picture parameter set, in a sequence parameter set, in a video parameter set, or when they change). For example, a frame header may include a flag (mfso_enable) that, in one state (e.g., TRUE), indicates usage of a set of uniformly-sized sample intensity bands and, in another state (e.g., FALSE), indicates usage of a set of non-uniformly-sized sample intensity bands.

In another embodiment, the range R of sample values may be divided into N segments from a minimum to a maximum intensity value with each set of adjacent M segments being grouped together to form a band for the MFSO 400. In this implementation, N and M may be positive integers, with $N \geq M$.

In a further embodiment, classification of reconstructed samples $r_i$ may occur by deriving an index band_idx as follows:

$$band\_idx = r_i >> (bitDepth - maxBandLog2)$$

where bitDepth corresponds to the bit depth of the reconstructed sample in the applicable color plane and maxBand-Log2 is the log 2 of the maximum allowed number of bands.

In an embodiment, band information for a reconstructed sample $r_i$ may be computed at a pixel level. For example, the intensity value of each reconstructed sample $r_i$ may be used to check which band the current sample belongs to.

In another embodiment, band information for a reconstructed sample $r_i$ may be computed at a block level. For example, the average intensity value of a pixel block to which the reconstructed sample $r_i$ belongs may be used to assign the reconstructed sample $r_i$ to a sample intensity band. The block can be a superblock (SB), a coding tree unit (CTU), a coded block, partitioning unit, transform unit, prediction unit, a filter unit, or the like.

In an embodiment, band information for a reconstructed sample $r_i$ may be computed from the value of the reconstructed sample $r_i$ itself, a value representing the sample's content in a single color plane. In another embodiment, band information for the reconstructed sample $r_i$ may be computed not only from its own value but also the values of reconstructed samples of other color components to which the reconstructed sample $r_i$ is related. Oftentimes, owing to the chroma format (e.g., 4:4:4 vs. 4:2:0, etc.) being used by the system, there may not be perfect registration between all luma samples and all Cb and Cr chroma samples. In such instances, it may be useful to downscale reconstructed luma samples to match reconstructed Cb and Cr chroma samples. Alternatively, it may be useful to upscale reconstructed Cb and Cr chroma samples to match reconstructed luma samples.

In an embodiment, the reconstructed samples $r_i$ taken before application of other in-loop filters may be used to compute the band information. Alternatively, the reconstructed samples $r_i$ may be taken after other in-loop filters is(are) used to compute band information.

As yet another example, an MFSO 400 may employ both uniformly-sized and non-uniformly sized sample intensity bands during operation. An encoder (FIG. 2) may signal use a type of sample intensity bands (e.g., whether uniformly-sized bands or non-uniformly sized bands are to be used) in channel data such as in an APS, in a slice header, in a tile header, in a picture parameter set, in a sequence parameter set, in a video parameter set.

In another embodiment, the feature detector 410 may classify a reconstructed sample ri (FIG. 5) according to coding parameters selected for the pixel block to which the sample belongs. For example, the feature detector 410 may select a feature ID based on a coding mode of the pixel block (e.g., whether the reconstructed sample ri belongs to a pixel block that was coded by intra prediction, by inter prediction mode, etc.). In another example, the feature detector 410 may select a feature ID based on transform processes and/or coefficient coding selected for the pixel block to which the sample belongs such as the transform size and type, or Coded-Block Flags (CBF)). For example, the feature ID may be derived from a CBF flag state, whether is zero or not. In another example, the feature detector 410 may select a feature ID based on a size of the reconstructed sample's pixel block, a partition type of the reconstructed sample's pixel block, a quantization parameter (QP) of the reconstructed sample's pixel block, and/or motion information (motion vectors, reference frames, motion model parameters, etc.) of the reconstructed sample's pixel block.

In a further example, the feature detector 410 may select a feature ID based on parameters selected by other in-loop or out-of-loop filtering processes applied to the reconstructed sample such as ALF block classification results, CDEF information, and the like.

In an embodiment, the features on which the feature detector 410 relies to generate its feature IDs may vary for different reconstructed samples. For example, the features may vary on a pixel block-by-pixel block basis, a slice-by-slice basis, or a frame-by-frame basis. An encoder may signal its selection of the feature(s) being used by the feature detector 410 in Higher Level Syntax (HLS) structures, such as APS, slice header, tile header, frame header, PPS, SPS, VPS or the like.

As discussed, the index calculator 420 may generate indices d0, d1 to the offset calculator 430. In an embodiment, the index calculator 420 may generate the indices for a reconstructed sample $r_i$ by an analysis of the reconstructed sample $r_i$ in context of neighboring reconstructed samples from the same color plane as the reconstructed sample $r_i$.

One such embodiment is illustrated in FIG. 6, where a reconstructed sample $r_i$ 610 is illustrated with neighboring samples 615-690. The index calculator 420 may operate according to multiple 3-tap filters where filter inputs, called p0 and p1 respectively are selected according to different filter directions. In one aspect, six filter combinations may be used such as described in Table 1 below:

TABLE 1

| Direction | Source Sample for $p_0$ | Source Sample for $p_1$ |
|---|---|---|
| 1 | Sample 620 | Sample 685 |
| 2 | Sample 615 | Sample 690 |
| 3 | Sample 625 | Sample 680 |
| 4 | Sample 650 | Sample 655 |
| 5 | Sample 640 | Sample 665 |
| 6 | Sample 630 | Sample 675 |

It is expected that system designers may tailor the number of different directions and inputs thereto to suit their individual application needs.

In an aspect, an encoder may select a direction to apply during coding. The direction may be changed at predetermined levels of a coding hierarchy such as at the Cb/Cr color component level. An encoder may signal its selected direction in a coded bitstream in an appropriate designator. For example, a variable filter_sup may be exchanged that indicates the selected filter for each corresponding color component. For the configuration illustrated in FIG. 6, the filter_sup syntax element may be signaled using 3 bits.

For each filter direction, the MFSO 400 may calculate a pair of delta values $m_0$, $m_1$ represented as $m_j = rc_i - p_j$, where $j = 0, 1$. Thereafter, the index calculator 420 may generate quantization value $d_0$, $d_1$ from the delta values $m_0$, $m_1$ as:

$$di = -1, \text{ if } m < -thr;$$

$$di = 0, \text{ if } -thr <= m <= thr; \text{ and}$$

$$di = 1, \text{ if } m > thr.$$

where thr is a quantization step size, thr can be a predetermined value set by the encoder. For example, thr may take values of 8, 16, 32, or 64. Moreover, the thr value may be set dynamically during operation and may be signaled from an encoder to a decoder in a coded bitstream.

In an embodiment, the offset calculator 430 may be implemented as a multi-dimensional look up table (LUT) that is indexed by the feature IDs provided by the feature detector 410 and the indices output by the index calculator 420. Prior to runtime operation of the MFSO 400, the LUT may be pre-populated by offset values that are appropriate to the samples being processed. during runtime operation, the MFSO 400 may read offset values out from the LUT and supply them to the filter 440.

The LUT may have sub-tables that correspond to the different feature IDs generated by the feature detector 410. In one embodiment, the feature detector 410 may classify an input sample both according to a sample intensity band information and based on edge information. In this aspect, the feature ID may possess a first component (i) representing the sample's band index and a second component (j) representing the sample's edge index. These (i, j) pairs may correspond to associated offset values $s_{ij}$ which are used by filter 440. For example, when there are N bands and N LUTs, each band may have an associated LUT with different sets of entries. Exemplary values N may be 8, 16, and 32.

In an embodiment, LUTs may be derived dynamically. For example, they may be signaled at a sequence-level, a frame-level, tile-level, a CTU/SB level, or a pixel block level of a coding hierarchy.

In another embodiment, the offset calculator 430 may have are N LUTs in MFSO 400, each LUT associated with a corresponding sample intensity band. Each LUT may have M entries, each entry storing an offset value. In this embodiment, an encoder may signal M*N offset values signaled in an HLS (e.g., as part of an APS, a slice header, a tile header, a frame header, a PPS, a SPS, a VPS or the like).

In another embodiment, the offset calculator 430 may develop a parametric model of offsets that defined by parameters. For example, the samples in the luma and chroma component of the MFSO 400 may be used to derive a linear relationship $s=A*y+B*c$, where A and B are the coefficients to be derived, y refers to the luma sample value, c refers to a Cb or Cr sample value under evaluation, and s is the output offset value that is used in the filtering process of the MFSO 400. During operation, an encoder may estimate values of A and B that minimize distortion during application of the MFSO 400 which may be signaled to a decoder. Alternatively, values of A and B may be derived implicitly from a neighborhood of reconstructed samples about a sample $r_i$ being processed, which may reduce signaling overhead within a system.

Another example of use of parametric model may employ reconstructed samples in all three color planes in a non-linear relationship $s=f_0(y_i)+f_1(cb_i)+f_2(cr_i)$, where $f_0$, $f_1$, and $f_2$ are functions which map the input values to output values, $y_i$ refers to the luma sample value, $cb_i/cr_i$ refer to the Cb/Cr sample value, and s is the output offset value that is used in the filtering process of the MFSO 400. During operation, an encoder may estimate, from among a set F of candidate function, functions $f_0$, $f_1$, and $f_2$ that minimize distortion during application of the MFSO 400. The encoder may identify to a decoder its selections of the $f_0$, $f_1$, and $f_2$ functions in channel signaling. Alternatively, the $f_0$, $f_1$, and $f_2$ functions may be derived implicitly from a neighborhood of reconstructed samples about a sample being processed, which may reduce signaling overhead within the system.

When parametric models are derived dynamically, they may be signaled at a sequence-level, a frame-level, tile-level, a CTU/SB level, or a pixel block level of a coding hierarchy.

In an embodiment, when offset values in a LUT or a parametric model is developed dynamically during runtime operation, an encoder need not signal the LUT or parametric model in its entirety. In some implementations, it may be sufficient for an encoder to signal some offset values of an LUT, and to have a decoder derive remaining offset values from the signaled offset values, or the remaining offset values are fixed values. Consider, for example, a system that employs a nine entry look up table corresponding to a given feature ID, an encoder might signal a sub-set of offset values s0, s1, s2, s3 and s4 for select combinations and a decoder may develop a full table by inverting the offset values as:

| Feature ID | Offset |
|---|---|
| 0 | s0 |
| 1 | s1 |
| 2 | s2 |
| 3 | s3 |
| 4 | s4 |
| 5 | −s3 |
| 6 | −s2 |
| 7 | −s1 |
| 8 | −s0 |

As another example, the encoder might signal a sub-set of offset values s0, s1, s2, s3 and s4 for select combinations and a decoder may develop a full table by inverting the offset values as:

| Feature ID | Offset |
|---|---|
| 0 | s0 |
| 1 | s1 |
| 2 | s2 |
| 3 | s3 |
| 4 | s4 |
| 5 | s3 |
| 6 | s2 |
| 7 | s1 |
| 8 | s0 |

It is expected that, during implementation, system designers may tailor derivation values to suit their individual application needs.

In a further embodiment, a single LUT may be developed that is indexed jointly by feature IDs output by the feature detectors and indices d0, d1 output by the index calculator 420. For example, in an implementation where the feature ID is generated as a single bit binary value, the LUT take a form as follows:

| Feature ID | d0 | d1 | Offset |
|---|---|---|---|
| 0 | −1 | −1 | s0 |
| 0 | −1 | 0 | s1 |
| 0 | −1 | 1 | s2 |
| 0 | 0 | −1 | s3 |
| 0 | 0 | 0 | s4 |
| 0 | 0 | 1 | s5 |
| 0 | 1 | −1 | s6 |
| 0 | 1 | 0 | s7 |
| 0 | 1 | 1 | s8 |
| 1 | −1 | −1 | s9 |
| 1 | −1 | 0 | s10 |

13

-continued

| Feature ID | d0 | d1 | Offset |
|---|---|---|---|
| 1 | −1 | 1 | s11 |
| 1 | 0 | −1 | s12 |
| 1 | 0 | 0 | s13 |
| 1 | 0 | 1 | s14 |
| 1 | 1 | −1 | s5 |
| 1 | 1 | 0 | s6 |
| 1 | 1 | 1 | s7 |

It is expected that, during implementation, system designers may the number of feature IDs and the offset values to suit their individual application needs.

In another embodiment, a filter scaling factor x is used for the MFSO 400. The said scaling refers to scaling the offset value produced by the MFSO 400 by a factor of x. The value of x can be signaled at sequence level, frame level, tile level, CTU/SB level, or coded block level. In such a case, an offset value derived by the offset calculator 430 may be scaled by the x factor received via a channel.

In an embodiment, a feature ID may represent a band of sample intensity, the offset calculator 430 may possess a LUT corresponding to each available band with each LUT storing values $s_{ij}$ associated with their respective band i and entry j (the entries j corresponding to respective combinations of $d_0$ and $d_1$). In this embodiment, an input sample may be classified using band information, the output is a band index denoted as i, and it also may be classified using edge information, the output is an edge index denoted as j. Each (i, j) pair has an associated offset value sij which is used in the filtering process of the MFSO 400.

In another embodiment, the current color representation, e.g. the matrix coefficients that may be associated with the video, could be used to adjust the offset values of the MFSO 400 based on the values of luma and/or Cb and Cr. For example, certain relationships and limits for the Cb and Cr components may be derived based on a color representation. Such limits could be considered to adjust base offset values stored in a LUT depending on the value of the signal and therefore avoid using some offsets at certain areas.

The filter 440 may apply offset filtering to reconstructed samples using an offset value that is obtained from the offset calculator 430. The filter 440 may generate a filtered reconstructed sample that represents the output of the MFSO 400. The MFSO 400 may have a predetermined number F of taps.

In an embodiment, the MFSO 400 may have a number of taps F that may be signaled by an encoder in a channel. Similarly, the MFSO 400 may have multiple candidate filter shapes that may be selected according to signaling provided in a channel. The filter shape may be selected and signaled at the sequence-level, frame-level, tile-level, CTU/SB level, or coded block level. Alternatively, the number of taps and/or filter shape may be selected according to a feature ID output by the feature detector 410.

In an embodiment, the filter 440 may apply a filtering direction that is based on current luma and chroma relationships. The said relationships include but are not limited to the chroma subsampling format and the location of the chroma samples relevant to the luma samples.

In another embodiment, the filter 440 may apply a number F of filter taps according to current luma and chroma relationships. The said relationships include but are not limited to the chroma subsampling format and the location of the chroma samples relevant to the luma samples.

In an embodiment, a selection of the number of taps, the filter shape and/or the offset value of the MFSO 400 may be entropy coded, using a universal variable length code ("UVLC"). Alternatively, one or more of these values may be signaled using fixed length coding.

During runtime operation of coders and decoders, MFSOs may operate in synchronized state. Although operational settings of the MFSO 400 may vary dynamically during operation, the operational settings present at an MFSO 400 when coding a given pixel block should be present also at an MFSO 400 when the same pixel block is decoded. In an embodiment, an encoder and a decoder may exchange signaling as appropriate to synchronize state of their MFSOs.

In one embodiment, the number of bands for each color component may be signaled. For example, an encoder may provide a value max_band_log 2, which represents the log 2 of a maximum allowed number of bands for each color component. It may be convenient to signal max_band_log 2 using 2 bits, which identify the number of allowed number of bands as one of 1, 2, 4, and 8.

In another embodiment, a selection of a filter to be used for each color component may be signaled. As discussed with respect to FIG. 6 above, an MFSO 400 may support several different filters. An encoder may exchange a variable filter_sup that indicates the selected filter for each corresponding color component. It may be convenient to signal filter_sup using 3 bits.

In a further embodiment, an identifier of sample intensity threshold(s) may be signaled. For example, an encoder may supply a thr_idx value representing an index of threshold values for each color component. In one application, it may be convenient to signal thr_idx using 2 bits, identifying sample intensity threshold values of 8, 16, 32, or 64.

In another embodiment, filter offset values may be signaled. In one application, it may be convenient to signal filter offset values using 3 bits, representing selections of predetermined offset values from the set {−10, −7, −3, 0, 1, 3, 7}.

In an embodiment, flags may be provided to signal when MFSO is enabled or disabled. For example, it may be convenient to provide a 1-bit mfso_enable signal for each color component, indicating whether MFSO is enabled for the color component. In another aspect, it may be convenient to provide a 1-bit mfso_blk_ctr signal for each 128×128 super block, indicating whether MFSO is enabled for the super block.

In one embodiment, offset values developed by an offset calculator 430 may be developed by an encoder through a training operation that derives offset values from training sequences based on an estimate of the values that minimize distortion when the MFSO 400 is applied. Derived offset values may be communicated to a decoder (FIG. 1) through a variety of techniques. For example, derived MFSO values may be communicated expressly at a sequence-level, frame-level or tile-level in a communication hierarchy. In an implementation, the encoder may communicate a single set of information is signaled per sequence or per frame or per tile, the Y/Cb/Cr components share the signaled information.

In an embodiment, training may derive a linear relationship s=A*y+B*c, where A and B are the coefficients to be derived, y refers to the luma sample value, c refers to the Cb or Cr sample value, and s is the output offset value that is used in the filtering process of the MFSO 400. The coefficient values may be signaled from encoder to decoder, which may be used by a decoder to derive offset values for its MFSO 400.

In another embodiment, the samples in all three-color components of the MFSO 400 may be used in a non-linear relationship $s=f_0(y)+f_1(cb)+f_2(cr)$, where $f_0/f_1/f_2$ are derived functions that map input values to output values, y refers to the luma sample value, cb/cr refer to the Cb/Cr sample value, s is the output offset value that is used in the filtering process of the MFSO 400. Function identifiers may be signaled from encoder to decoder, which may be used by a decoder to derive offset values for its MFSO 400.

In another embodiment, the current color representation, e.g. the matrix coefficients that may be associated with the video, could be used to adjust the offset values of the MFSO 400 based on the values of y and/or cb and cr. For example, certain relationships and limits for the Cb and Cr components are derived based on the color representation. Such limits could be considered to adjust the offset values of the MFSO 400 depending on the value of the signal and therefore avoid using some offsets at certain areas.

In an embodiment, when training LUTs for the MFSO 400 at encoder, the initial block-level on/off state of the MFSO 400 may be inherited from state of other loop filters of the current frame or previously-coded frames for faster encoder convergence. For example, the state of an SAO filter, an ALF, a CCALF, an LR filter, or a CDEF may determine state of the MFSO 400 during training.

In an embodiment, an encoder may signal the number of LUTs (L) at work in an MFSO 400. In one example, L is a fixed positive integer value. In another example, L may vary during operation, and changes to L may be signaled at sequence-level, frame-level, or tile-level, or CTU/SB level, or coded block level.

In an embodiment, an MFSO 400 may have L LUTs, each associated with a sample intensity band of the MFSO 400. Each LUT may have M entries, each of which represents an offset value. In this embodiment, there would be M*L offset values, which may be signaled in HLS (APS, Slice or Tile header, frame header, PPS, SPS, VPS). It may occur that, for LUTs, LUT entries may possess the same offset value for multiple ones of the sample intensity bands in which case, the LUT may have fewer than M entries. As discussed, an LUT can be one or multiple parametric models defined by parameters.

In another embodiment, when deriving an entry of the MFSO LUT given the input samples, the following equation can be used: $m=r1-((a*p0+b*p1)>>k)$, where k is a positive integer. In an aspect, values of a, b, and k may be signalled in HLS (APS, Slice or Tile header, frame header, PPS, SPS, VPS). Alternatively, they may be predefined between an encoder or a decoder.

In another embodiment, multiple sets of MFSO information may be signaled at a first level (e.g., sequence-level) of a protocol hierarchy. At lower levels of the protocol hierarchy (e.g., a frame-level, slice-level, or pixel block-level), an encoder may signal an index that selects a set of MFSO information to be used.

In another embodiment, when the filter shape of the MFSO 400 is entropy encoded, e.g., signaled using a UVLC, the signaling of other information of the MFSO 400 may be conditioned based on the filter shape. In one example, a UVLC code of 0 for the filter shape may mean that the MFSO 400 is unused (e.g., off); in this case, no other information of the MFSO 400 need be signaled.

In another embodiment, an MFSO LUT may be signaled once per a group of N frames or N blocks. In the first frame (or block) of the group, an LUT may be signaled. For the remaining frames or blocks of the group, if an encoder alters the MFSO LUT, the encoder may signal data that alters the LUT, for example, by replacing the LUT entirely or by signaling changes to the previously-used LUT.

In a further embodiment, block-level state of the MFSO 400 (e.g., whether it is on or off) may be inherited from block-level state other loop filters 272, 276 in the in-loop filter system 270, such as an SAO filter, an ALF, a CCALFs, an LR filters, or a CDEF.

In another embodiment, on/off state of the MFSO 400 may be derived from other coding information of the block or/and its neighboring blocks, such as transform type, prediction mode, the number of coefficients, and so on. In this manner, signaling overhead of the MFSO process may be reduced.

In another embodiment, an encoder may signal an array of MFSO offset values and, for each combination, the encoder may signal an index of the offset value s denoting the position of the offset value s in the MFSO array. Such offset values and/or the indexes can be signaled at sequence-level, frame-level, tile-level, or block-level. In another embodiment, for each combination, an offset value s is signaled at sequence-level, frame-level, tile-level, block-level.

It is proposed that the techniques of utilizing multiple features when classifying/grouping input samples also apply to other loop filtering methods. In one embodiment, the multiple feature techniques are may be used in a Constrained Directional Enhancement Filter (CDEF) edge direction search process. Typically, a CDEF direction search operates on reconstructed pixels, just after a deblocking filter. Since those pixels are available to the decoder, the directions require no signaling. The search operates on 8×8 blocks, for each block the direction that best matches the pattern in the block is determined by minimizing the sum of squared differences (SSD) between the quantized block and the closest directional block. The identified direction is then used to select filter shapes and filter coefficients. In this application, feature IDs generated by a feature detector 420 also may be employed to select the filter shapes and filter coefficients for a CDEF filter. Using such techniques, a CDEF may expand a set of candidate directional blocks from eight to a larger number such as 16, 32, or 64 candidate blocks that combines the directions and the feature IDs.

Figures 7, 8, 9:
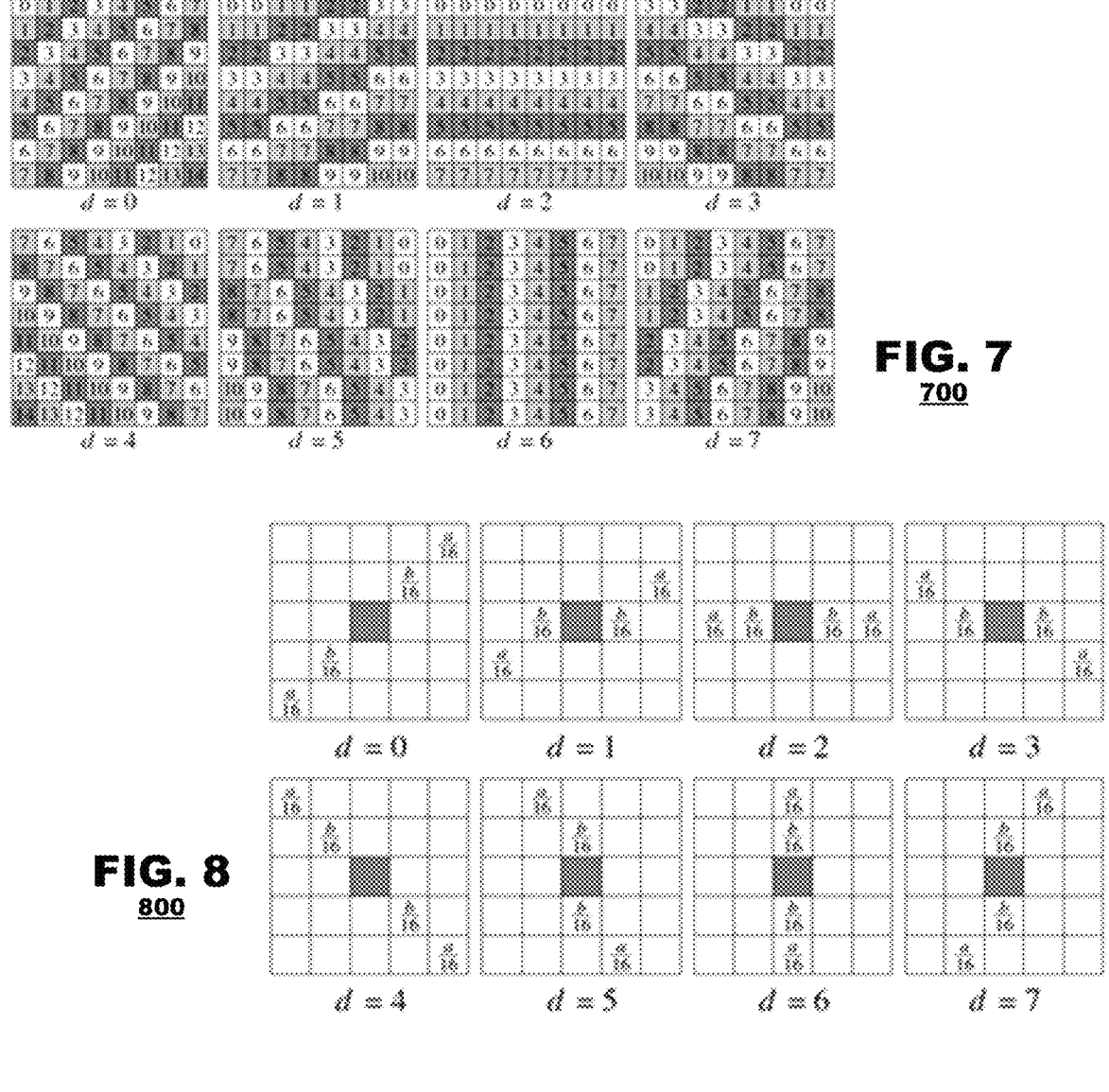
FIG. 7 shows an exemplary set of candidate directional blocks suitable for use with embodiments of the present disclosure.
FIG. 8 shows an exemplary set of filter taps suitable for use with embodiments of the present disclosure.
FIG. 9 shows an exemplary set of filter taps suitable for use with embodiments of the present disclosure.

A CDEF works by identifying a direction of each block and then adaptively filtering along the identified direction and to a lesser degree along directions rotated 45 degrees from the identified direction. A CDEF direction search typically operates on reconstructed pixels, just after application of a deblocking filter, operating on 8×8 blocks and finding the direction that best matches the pattern in the block is determined by minimizing the sum of squared differences (SSD) between the quantized block and the closest directional block. FIG. 7 shows an exemplary set of eight candidate directional blocks. In an embodiment, a multi-feature approach may be employed to select the filter shape and filter coefficients of the CDEF filter. A filter shape and filter coefficient may be selected based on features detected through edge detection, sample intensity analysis, and/or coding/filtering parameters. In this manner, a CDEF may select among its candidate modes using the multi-feature analysis described herein either working alone or in conjunction with the SSD technique that is conventional to CDEF filters.

A CDEF may use a non-linear low-pass filter designed to remove coding artifacts without blurring sharp edges. It achieves this by selecting filter tap locations based on the identified direction, but also by preventing excessive blurring when the filter is applied across an edge. The latter is achieved using a non-linear low-pass filter that deemphasizes pixels that differ too much from the pixel being filtered. CDEF defines primary taps and secondary taps. The primary taps follow the direction d, and the weights such as shown in the example of FIG. 8. For the primary taps, the weights alternate for every other strength, so that the weights for strengths 1, 3, 5, etc. are different from the weights for strengths 2, 4, 6, etc. The secondary taps form a cross, oriented 45 degree off the direction d and their weights as shown in the example of FIG. 9.

In another embodiment, the multiple feature techniques may be used in an ALF block classification process. Ordinary ALF processes classify input blocks according to the blocks' directionality D and a quantized value of activity $\hat{A}$. In an aspect, multi-feature detection analyses described in hereinabove may be used along or in conjunction with the D and A that are used to identify the class of the current block. For example, the sample intensity analyses may provide estimates of sample intensity range denoted as P. A classification index C may be derived from D, $\hat{A}$ and P. Thereafter, ALF processing may be applied using the classification index.

The foregoing discussion has described operation of the aspects of the present disclosure in the context of video coders and decoders. Commonly, these components are provided as electronic devices. Video decoders and/or controllers can be embodied in integrated circuits, such as application specific integrated circuits, field programmable gate arrays, and/or digital signal processors. Alternatively, they can be embodied in computer programs that execute on camera devices, personal computers, notebook computers, tablet computers, smartphones, or computer servers. Such computer programs typically are stored in physical storage media such as electronic-, magnetic-, and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Video coders and decoders may exchange video through channels in a variety of ways. They may communicate with each other via communication and/or computer networks as illustrated in FIG. 1. In still other applications, video coders may output video data to storage devices, such as electrical, magnetic and/or optical storage media, which may be provided to decoders sometime later. In such applications, the decoders may retrieve the coded video data from the storage devices and decode it.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. A filtering system, comprising:

a feature detector having an input for samples reconstructed from coded video data representing a color component of source video, and having an output for data identifying a feature recognized therefrom, an index calculator having an input for the reconstructed samples and having an output comprising offset indices to be input to an offset calculator, the offset calculator storing offset values to be indexed by the offset indices, having a first input for the feature identification data from the feature detector and a second input for the offset indices from the index calculator, and having an output for a filter offset, the output from the offset calculator based in part on the offset indices from the index calculator, and a filter having an input for the filter offset from the offset calculator and an input for the reconstructed samples, and having an output for filtered samples.

2. The filtering system of claim 1, wherein the feature identification data from the feature detector represents a classification of a reconstructed sample into one of a plurality of sample intensity bands.

3. The filtering system of claim 2, wherein the sample intensity bands are defined by signaling provided by a video encoder that generated the coded video data.

4. The filtering system of claim 2, wherein the classification of the reconstructed sample is derived from an intensity value of a co-located sample reconstructed from coded video data representing another color component of the source video.

5. The filtering system of claim 1, wherein the feature identification data from the feature detector represents a classification of a block of reconstructed samples into one of a plurality of sample intensity bands.

6. The filtering system of claim 1, wherein the feature identification data from the feature detector represents a directionality classification of reconstructed samples.

7. The filtering system of claim 1, wherein the feature identification data from the feature detector represents a texture classification of reconstructed samples.

8. The filtering system of claim 1, wherein the feature identification data is derived from a prediction mode of a block of coded video data from which the reconstructed sample were reconstructed.

9. The filtering system of claim 1, wherein the feature identification data is derived from a coding parameters of a block of coded video data from which the reconstructed sample were reconstructed.

10. The filtering system of claim 1, wherein the reconstructed samples are received from an output of a second filter of a video coding system, and the feature identification data is derived from a filtering parameter of the second filter.

11. The filtering system of claim 1, wherein the offset calculator is a multi-way lookup table having a way corresponding to each of a number of candidate feature identifiers.

12. The filtering system of claim 11, wherein at least one entry of the lookup table is provided by a video encoder that generated the coded video data.

13. The filtering system of claim 1, wherein the offset calculator is a computer that calculates the filter offset according to a parametric model, and parameters of the parametric model are provided by a video encoder that generated the coded video data.

14. A method, comprising:

detecting, from input samples reconstructed from coded video data representing a color component of source video and from output identifiers of detected features, a predetermined feature of the input samples, estimating a filter offset based on the predetermined feature detected from the input samples and from the output identifiers, generating offset indices based on at least the input samples, the offset indices referencing a stored filter offset value, looking up the stored filter offset value in response to the offset indices and an identifier of the detected feature, and filtering the input samples reconstructed from the coded video data according to the filter offset value.

15. The method of claim 14, wherein the feature is detected from an intensity of the input samples.

16. The method of claim 14, wherein the feature is detected from a classification of a reconstructed sample into one of a plurality of sample intensity bands.

17. The method of claim 14, wherein the feature is detected from a classification of a block of reconstructed samples into one of a plurality of sample intensity bands.

18. The method of claim 14, wherein the feature is detected from an intensity value of a co-located sample reconstructed from coded video data representing another color component of the source video.

19. The method of claim 14, wherein the feature is detected from a directionality classification of reconstructed samples.

20. The method of claim 14, wherein the feature is detected from a texture classification of reconstructed samples.

21. The method of claim 14, wherein the feature is detected from a prediction mode of a block of coded video data from which the reconstructed sample were reconstructed.

22. The method of claim 14, wherein the feature is detected from a coding parameter of a block of coded video data from which the reconstructed sample were reconstructed.

23. A non-transitory computer readable medium having program instructions stored thereon that, when executed by a processing device, cause the processing device to perform a method, comprising:

detecting, from input samples reconstructed from coded video data representing a color component of source video and from output identifiers of detected features, a predetermined feature of the input samples, estimating a filter offset based on the predetermined feature detected from the input samples and from the output identifiers, generating offset indices based on at least the input samples, the offset indices referencing a stored filter offset value, looking up the stored filter offset value in response to the offset indices and an identifier of the detected feature, and filtering the input samples reconstructed from the coded video data according to the looked up filter offset value.

24. The non-transitory computer readable medium of claim 23, wherein the feature is detected from an intensity of the input samples.

25. The non-transitory computer readable medium of claim 23, wherein the feature is detected from a classification of a reconstructed sample into one of a plurality of sample intensity bands.

26. The non-transitory computer readable medium of claim 23, wherein the feature is detected from a classification of a block of reconstructed samples into one of a plurality of sample intensity bands.

27. The non-transitory computer readable medium of claim 23, wherein the feature is detected from an intensity value of a co-located sample reconstructed from coded video data representing another color component of the source video.

28. The non-transitory computer readable medium of claim 23, wherein the feature is detected from a directionality classification of reconstructed samples.

29. The non-transitory computer readable medium of claim 23, wherein the feature is detected from a texture classification of reconstructed samples.

30. The non-transitory computer readable medium of claim 23, wherein the feature is detected from a prediction mode of a block of coded video data from which the reconstructed sample were reconstructed.

31. The non-transitory computer readable medium of claim 23, wherein the feature is detected from a coding parameter of a block of coded video data from which the reconstructed sample were reconstructed.

* * * * *